(12) United States Patent
Kobayashi et al.

(10) Patent No.: US 11,752,967 B2
(45) Date of Patent: Sep. 12, 2023

(54) SIDE AIRBAG DEVICE

(71) Applicant: Autoliv Development AB, Vargarda (SE)

(72) Inventors: Yuto Kobayashi, Kanagawa (JP); Hiroyuki Shima, Kanagawa (JP); Hiroyoshi Shimono, Kanagawa (JP); Akira Ishimae, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 118 days.

(21) Appl. No.: 17/594,412

(22) PCT Filed: Mar. 30, 2020

(86) PCT No.: PCT/JP2020/014563
§ 371 (c)(1),
(2) Date: Oct. 15, 2021

(87) PCT Pub. No.: WO2020/213382
PCT Pub. Date: Oct. 22, 2020

(65) Prior Publication Data
US 2022/0176907 A1    Jun. 9, 2022

(30) Foreign Application Priority Data

Apr. 17, 2019    (JP) .................................. 2019-078489

(51) Int. Cl.
*B60R 21/231*    (2011.01)
*B60R 21/207*    (2006.01)

(52) U.S. Cl.
CPC ...... *B60R 21/23138* (2013.01); *B60R 21/207* (2013.01)

(58) Field of Classification Search
None
See application file for complete search history.

(56) References Cited

U.S. PATENT DOCUMENTS 8,905,431 B1 * 12/2014 Line ...................... B60R 21/207
                                                              280/730.2
9,302,643 B2 * 4/2016 Line ......................... B60N 2/58
(Continued)

FOREIGN PATENT DOCUMENTS

DE     202014003658 U1    9/2015
GB          2397047 A     7/2004
(Continued)

OTHER PUBLICATIONS

English translation of Office Action received in corresponding Korean application 1020217037144, dated Apr. 25, 2023.

*Primary Examiner* — Faye M Fleming
(74) *Attorney, Agent, or Firm* — Harness, Dickey & Pierce, P.L.C.; Stephen T. Olson

(57) ABSTRACT

A frame side plate part of a frame member of a seat along a side surface of a backrest; and a bracket attached to the frame side plate part in a condition where an airbag cushion and an inflator are secured. The frame side plate part has a notch region where a predetermined range of a front edge is cut out The bracket has: a base part which is fitted into the notch region of the frame side plate part and to which the airbag cushion and the inflator are secured; and a reaction force plate bent from a front side of the base part and extends to one side in a vehicle width direction. Guide grooves are formed on an upper edge and lower edge of the notch region, and the base part can be inserted into the notch region from the front along the guide grooves.

14 Claims, 17 Drawing Sheets

(56) References Cited

U.S. PATENT DOCUMENTS 11,040,686 B2 * 6/2021 Yamada ................. B60N 2/682
11,554,741 B2 * 1/2023 Bhagatkar ......... B60R 21/23138

FOREIGN PATENT DOCUMENTS

| JP | 10-166986 A | 6/1998 | |
|---|---|---|---|
| JP | 2007-314075 A | 12/2007 | |
| JP | 2016-107721 A | 6/2016 | |
| WO | WO-2013137355 A1 * | 9/2013 | ........... B60R 21/207 |

* cited by examiner (a)

(b)

(a)

A-A (b)

(a)

(b)

B-B
(c)

(a)　　　　　　　　　(b)

C-C
(c)

D-D
(d)

(a)　　　(b) E-E (c)

(a)

(b)

(a)

(b)

(a)

(b)

(a)

(b)

(a)

(b)

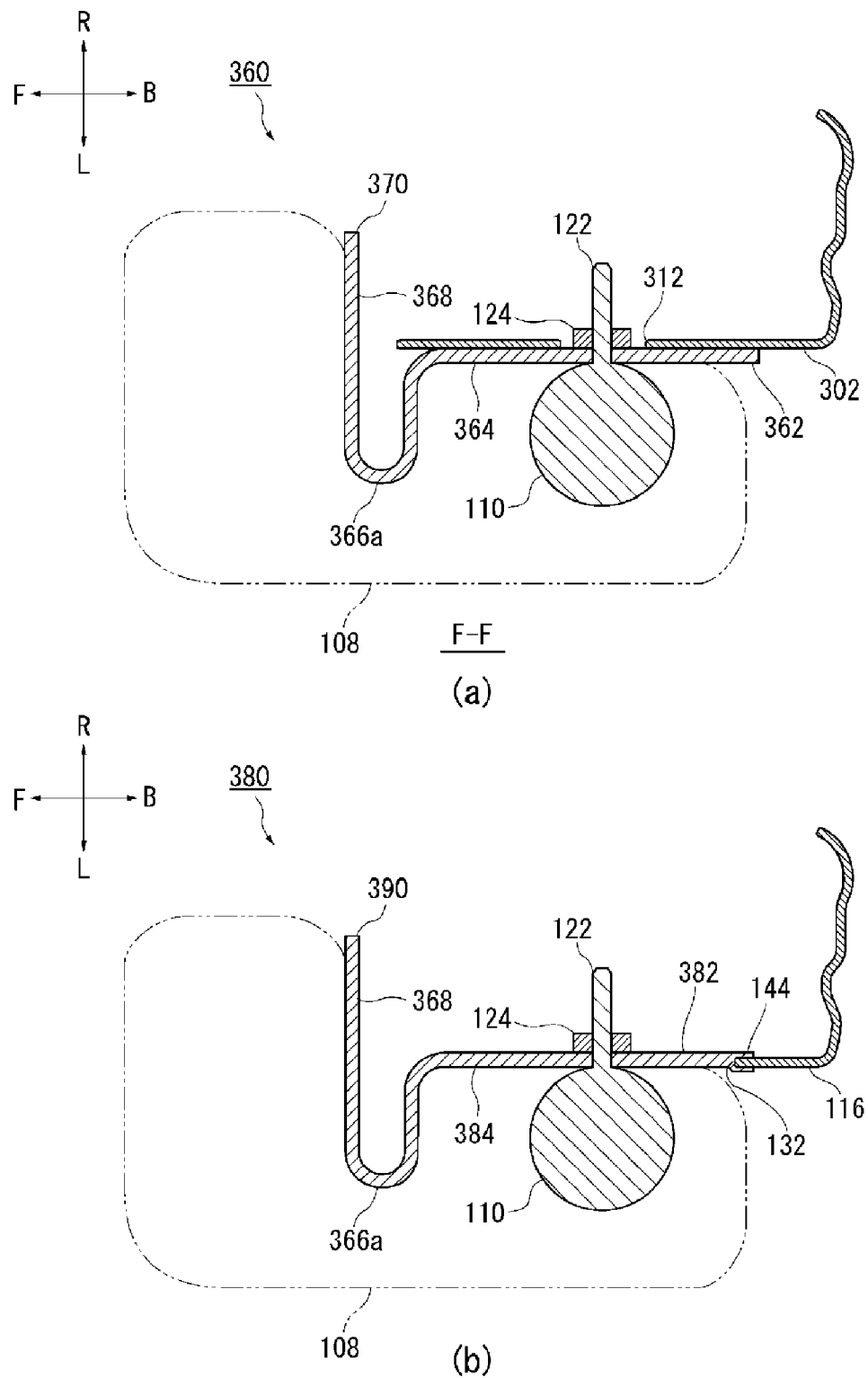

SIDE AIRBAG DEVICE

TECHNICAL FIELD

The present invention relates to a side airbag device mounted on a vehicle.

BACKGROUND TECHNOLOGY

Airbag devices have generally become standard equipment in vehicles in recent years. An airbag device is a safety device that is actuated in the event of an emergency such as a vehicle collision or the like to receive and protect an occupant by expanding and deploying a bag-shaped airbag cushion with gas pressure.

There are various types of airbag devices depending on the installation site and application. For example, a front airbag device is provided in a center of a steering wheel in order to protect a driver from a collision in a front-back direction. In addition, a curtain airbag device is provided in the vicinity of a ceiling above a side window, and a side airbag device is provided on a side part of a seat to protect an occupant from an impact in a vehicle width direction due to a side collision or the like.

An airbag cushion of a typical airbag device is stored in various sites of a vehicle in a wound or folded storing form. The airbag device may be provided with a predetermined bracket for rapid and smooth expansion and deployment of an airbag cushion. For example, in the vehicle far-side airbag device of Patent Document 1, a supporting plate 54 is provided along with a far-side airbag 38. Cited document 1 states that the supporting plate 54 supports the far-side airbag 38 during expansion and deployment, thereby reducing swaying of the far-side airbag 38.

PRIOR ART DOCUMENTS

Patent Documents

Patent Document 1: Japanese Unexamined Patent Application No. 2016-107721

SUMMARY OF THE INVENTION

Problem to be Solved by the Invention

However, in the configuration of Patent Document 1, as described in paragraph 0034, the far-side airbag 38 and supporting plate 54 are fastened and secured to a side frame 20A using a stud bolt 46 and a nut 48 extending from an inflator 40. Currently, airbag devices are required to have a configuration that enables easier assembly to a vehicle. In this respect, the configuration of Patent Document 1 for fastening and securing leaves room for improvement.

In view of the foregoing, an object of the present invention is to provide a side airbag device that can be easily assembled to a vehicle.

Means for Solving the Problems

In order to solve the aforementioned problem, a representative configuration of a side airbag device according to the present invention contains a frame side plate part along a side surface of a backrest of an internal frame of a vehicle seat, and a bracket attached to the frame side plate part in a condition where a predetermined airbag cushion and inflator are secured, where the frame side plate part has a notch region where a predetermined range of a front edge is cut out, the bracket has a base part fitted into the notch region of the frame side plate part and to which the airbag cushion and inflator are secured, a reaction force plate bent from a front side of the base part and extending in to one side in a vehicle width direction, a guide groove that is long in a front-back direction is formed on an upper edge or lower edge on either the notch region or the base part such that the other can slide, and the base part can be inserted into the notch region from the front along the guide groove.

According to the configuration described above, an airbag module can be assembled to the vehicle seat by simply inserting the base part of the bracket into the notch region of the frame side plate part along the guide groove. Therefore, assembly work is simple, and thus labor can be reduced.

A stopper groove may be formed on a rear edge of either of the notch region or the base part such that the other can be inserted. According to this configuration, the bracket can be fully assembled to the frame side plate part.

The stopper groove may be formed on a portion of the rear edge, and a protruding part that can be inserted in the stopper groove formed on a portion of the rear edge may be formed on a rear edge of the other. According to this configuration, the bracket can be fully assembled to the frame side plate part.

The guide groove described above may be formed on the upper and lower edges of the notch region or base part, and the stopper groove may be formed continuously with the guide grooves on the rear edge of the notch region or base part where the guide grooves are formed. Based on this configuration, the entire range of the edges of the bracket and the notch region are coupled to each other, and therefore, the rigidity of the frame side plate part can be further supplemented.

The frame side plate part described above may further have a predetermined first rib in a periphery of the notch region. The first rib can supplement the rigidity of the frame side plate part.

The frame side plate part may further have a box shaped part formed on one side in the vehicle width direction and open toward the front, and the notch region may be formed in a range on an inner side of the box shaped part of the front edge of the frame side plate part. The box shaped part can also supplement the rigidity of the frame side plate part.

The frame side plate part described above may further have a predetermined second rib provided continuously with the box shaped part. The second rib can also supplement the rigidity of the frame side plate part.

The guide groove described above may be formed on the upper edge of the notch region or the base part, the notch region may be formed over a range below the base part, and the reaction force plate may have a lower region extending below the base part and recessed along the notch region. The airbag cushion is stored in the recessed lower region, and thus a limited space inside the vehicle seat can be effectively utilized.

In order to solve the problem, another representative configuration of a side airbag device according to the present invention contains a frame side plate part along a side surface of a backrest of an internal frame of a vehicle seat, and a bracket attached to the frame side plate part in a condition where a predetermined airbag cushion and inflator are secured, where the bracket has a base part attached along a surface on an inner side of the frame side plate part in the vehicle width direction to which the inflator and the inflator are fixed, a reaction force plate extending in a vehicle width direction across a front edge of the frame side plate part from the base part, and a plurality of protruding parts extending from the base part or the reaction force plate and inserted into the frame side plate part.

According to the configuration described above, an airbag module can be assembled to the vehicle seat by simply inserting the protruding part of the bracket into the frame side plate part. Therefore, assembly work is simple, and thus labor can be reduced.

In order to solve the problem, another representative configuration of a side airbag device according to the present invention contains a frame side plate part along a side surface of a backrest of an internal frame of a vehicle seat, and a bracket attached to the frame side plate part in a condition where a predetermined airbag cushion and inflator are secured, where the bracket has a base part attached along a surface on an outers side of the frame side plate part in the vehicle width direction to which the inflator and the inflator are fixed, a reaction force plate extending in a vehicle width direction across a front edge of the frame side plate part from the base part, and a plurality of protruding parts extending from the base part or the reaction force plate and inserted into the frame side plate part.

According to the configuration described above, an airbag module can also be assembled to the vehicle seat by simply inserting the protruding part of the bracket into the frame side plate part. Therefore, assembly work is simple, and thus labor can be reduced.

The plurality of protruding parts may include one or a plurality of front side protruding parts extending toward the front edge of the frame side plate part from the reaction force plate, and the frame side plate part may have a front side insertion hole formed in the front edge and into which the one or plurality of front side protruding parts is inserted. Based on this configuration, the airbag module can be assembled to the vehicle seat.

The plurality of protruding parts may include one or a plurality of side surface protruding parts extending toward the frame side plate part from the base part, and the frame side plate part may have a side surface insertion hole formed penetrating or recessing in the vehicle width direction and into which the one or plurality of side surface protruding parts is inserted. Based on this configuration, the airbag module can be assembled to the vehicle seat.

A stud bolt extending from the inflator may penetrate the base part and protrude on the frame side plate part side, and the one or plurality of side surface protruding parts may include the stud bolt. By using the stud bolt, the airbag module can be assembled to the vehicle seat.

The frame side plate part described above may have a notch region where a predetermined range of the front edge of the frame side plate part below the base of the bracket is cut out, and the reaction plate may have a lower region extending below the base part and recessed along the notch region. The airbag cushion is stored in the recessed lower region, and thus a limited space inside the vehicle seat can be effectively utilized.

Effect of the Invention

The present invention can provide a side airbag device that can be easily assembled to a vehicle.

BRIEF DESCRIPTION OF THE DRAWINGS

FIG. 5(a), FIG. 5(b), FIG. 5(c), and FIG. 5(d).

FIG. 17(a) and 17(b) is a cross-sectional view of the side airbag device in FIG. 16(a) and a view illustrating a another modification example.

MODE FOR CARRYING OUT THE INVENTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Embodiment 1

Figure 1:
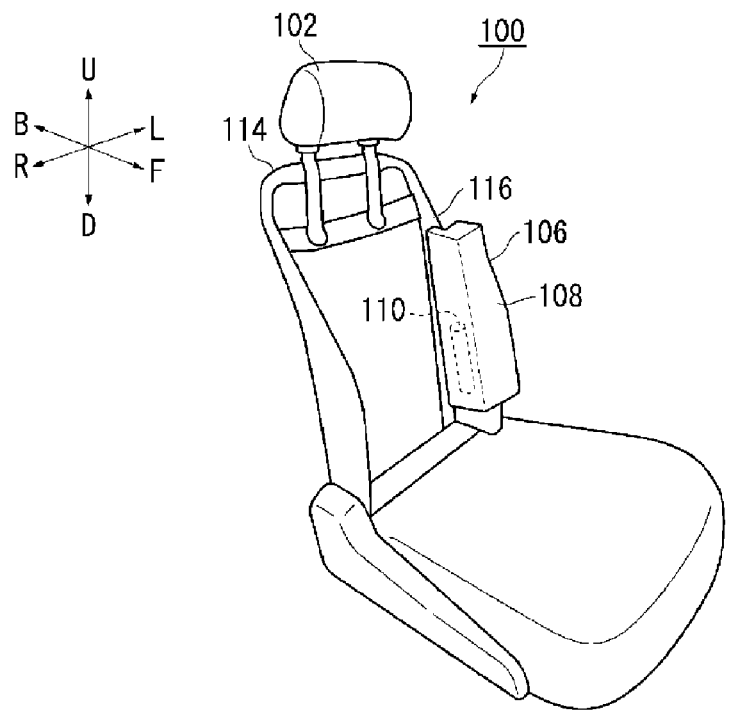
FIG. 1(a) and 1(b) is a view illustrating a side airbag device according to Embodiment 1 of the present invention.
Figure 1:
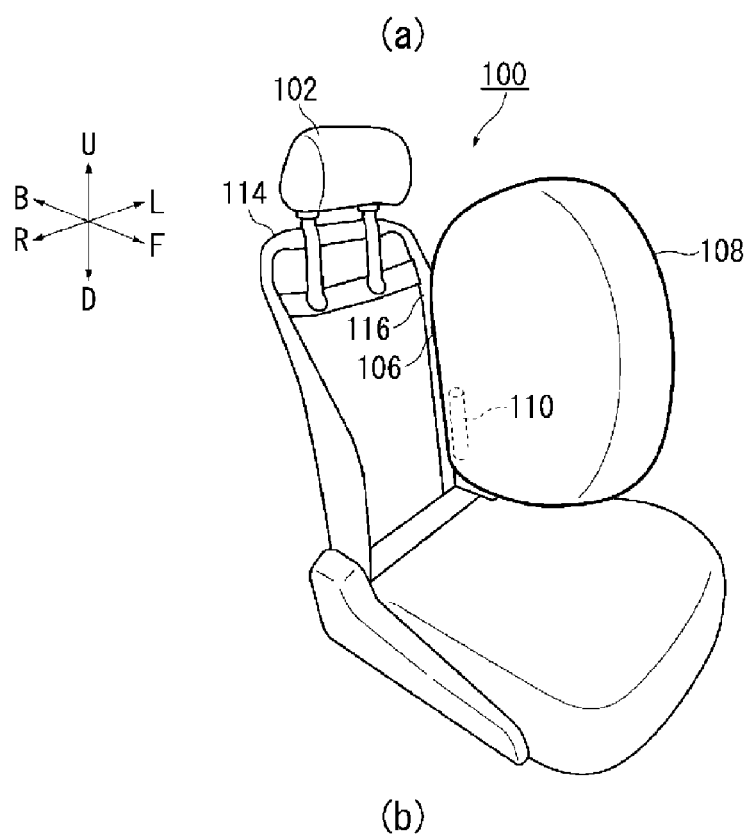

FIG. 1 is a view illustrating a side airbag device 100 according to Embodiment 1 of the present invention. FIG. 1(a) illustrates the side airbag device 100 and a seat 102 for a vehicle to which the side airbag device 100 is applied from a right side in a vehicle width direction toward the front of the vehicle. In FIG. 1, a front-back direction with regard to the seat 102 is appropriately indicated by arrows F (Forward) and B (Back), respectively, a left-right direction is appropriately indicated by arrows L (Left) and R (Right), respectively, and an up-down direction is appropriately indicated by arrows U (up) and D (down), respectively.

In present embodiment, the seat 102 is assumed to be disposed on a left side in a front row. However, the side airbag device 100 can be provided in any seat in the front row, a back row, and even on either left or right side of the vehicle. Furthermore, the seat 102 normally faces the front of the vehicle, but can also assumed to rotate to face the rear. Therefore, the directions indicated by arrows in each drawing are not intended to be limited to the front-back and left-right directions relative to the vehicle, but rather the front direction is "front" and a back side direction is "back" as viewed from an occupant regularly seated in the seat 102. Similarly, a right hand direction of the occupant at this time is "right" and a left hand direction is "left". Furthermore, with regard to the center of the body of the occupant at this time, a direction toward the head is "up" and a direction toward the leg is "down."

FIG. 1(*a*) illustrates the side airbag device 100 prior to operation. FIGS. 1(*a*) and 1(*b*) illustrate a frame member 114 inside a backrest of the seat 102 in a condition where a backrest cover and padding (packing material) are omitted. An airbag module 106 illustrated in FIG. 1(*a*) is a structure that integrally combines an airbag cushion 108, an inflator 110, and a bracket 112 described later. In the side airbag device 100 prior to operation, the airbag cushion 108 is in a storing form condensed by winding, folding, or the like.

The airbag module 106 is assembled to a frame side plate part 116 of the frame member 114. The frame side plate part 116 is a site on the frame member 114 along left and right side surfaces of the backrest. The frame side plate part 116 is provided in pairs on the left and right sides in the vehicle width direction. In the present embodiment, the airbag module 106 is assembled to the frame side plate part 116 on the left side in the vehicle width direction. Note that the airbag module 106 can also be assembled to the frame side plate part 116 on the right side in the vehicle width direction. In other words, the airbag module 106 can be provided either on a side part on a door side (near side) of the seat 102 that is closer to a collision point, or on a side part on an vehicle inner side (far side) of the seat 102 that is farther from the collision point.

FIG. 1(*b*) illustrates the side airbag device 100 during operation. When a vehicle collision is detected, the airbag cushion 108 utilizes gas from the inflator 110 to expand and deploy toward the front while pushing away a cover of the seat 102. The airbag cushion 108 has an overall flat shape in order to receive the occupant from the side. The airbag cushion 108 can be formed by stitching, adhering, or the like to a base material, or by weaving or the like using an OPW (One-Piece Woven) design.

Figure 2:
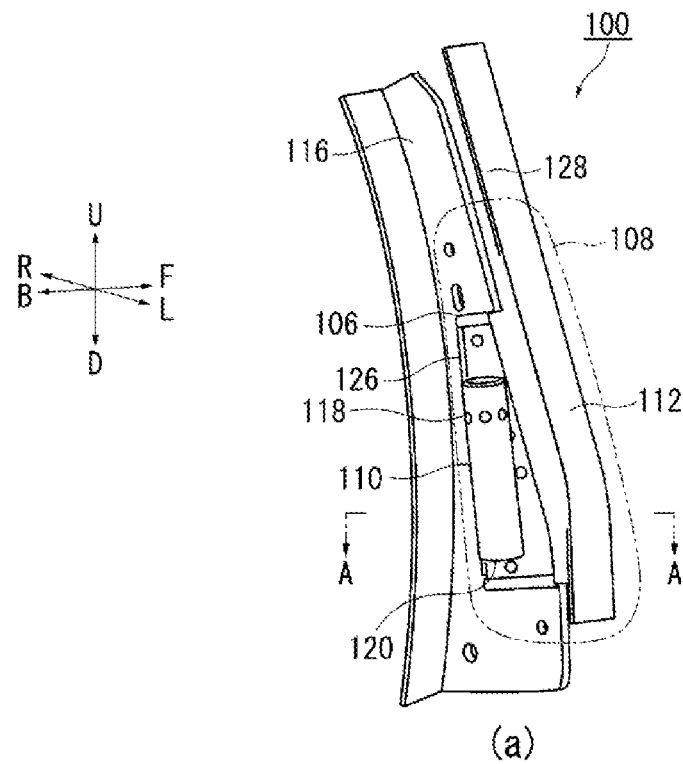
FIG. 2(a) and 2(b) is a view illustrating an enlarged airbag module in FIG. 1(a) from various directions.
Figure 2:
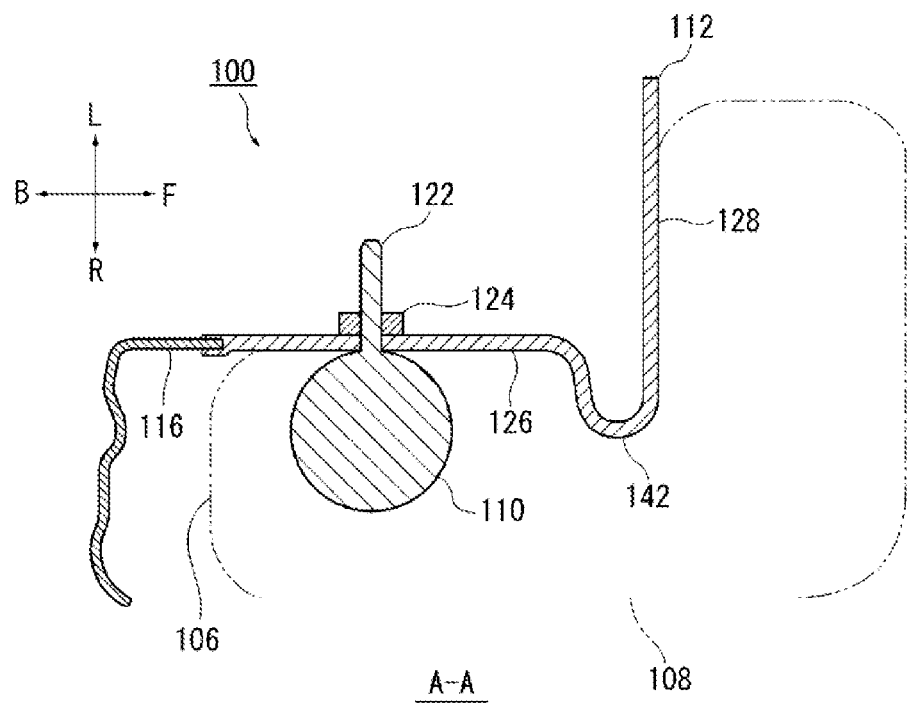

FIG. 2 is a view illustrating the airbag module 106 in FIG. 1(*a*) from various directions in an enlarged manner. FIG. 2(*a*) is an enlarged perspective view of the airbag module 106 in FIG. 1(*a*). In FIG. 2(*a*), the airbag cushion 108 is indicated by dashed lines, and the inflator 110 and bracket 112 are illustrated as transparent.

The inflator 110 is a gas generating device, and in the present embodiment, a cylindrical type is used. The inflator 110 is attached to an inner side of a base part 126 of the bracket 112 in the vehicle width direction (vehicle inner side). The inflator 110 has a gas ejection hole 118 on an outer peripheral surface of one end side and a terminal 120 (see FIG. 9) to which a predetermined harness is connected on another end side. The entire inflator 110 or a portion including the gas ejection hole 118 is inserted inside the airbag cushion 108. Furthermore, the inflator 110 is electrically connected to the vehicle side at the terminal 120 and operates upon receiving a signal from the vehicle side resulting from the detection of an impact to supply gas to the airbag cushion 108.

Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any type can be used for the inflator 110.

FIG. 2(*b*) is a cross-sectional view along A-A of the airbag module 106 in FIG. 2(*a*). The inflator 110 is provided with a total of two stud bolts 122 for attachment. The stud bolt 122 extends from a cylindrical main body of the inflator 110, passes through the bracket 112, and is tightened from a vehicle outer side by a nut 124. The stud bolt 122 of the inflator 110 is fastened to the bracket 112 such that the airbag cushion 108 is also secured to the bracket 112.

As illustrated in FIG. 2(*a*), the bracket 112 is a member that supports the airbag cushion 108 and the inflator 110. The bracket 112 has the base part 126 to which the inflator 110 is secured, and a reaction force plate 128 that provides a reaction force when the airbag cushion 108 is expanded. As illustrated in FIG. 2(*b*), the reaction force plate 128 is bent from a front side of the base part 126 and extends in the vehicle width direction to the vehicle outer side. The presence of the reaction force plate 128 allows the airbag cushion 108 to push against the reaction force plate 128 to expand and deploy efficiently toward the front of the vehicle.

Figure 3:
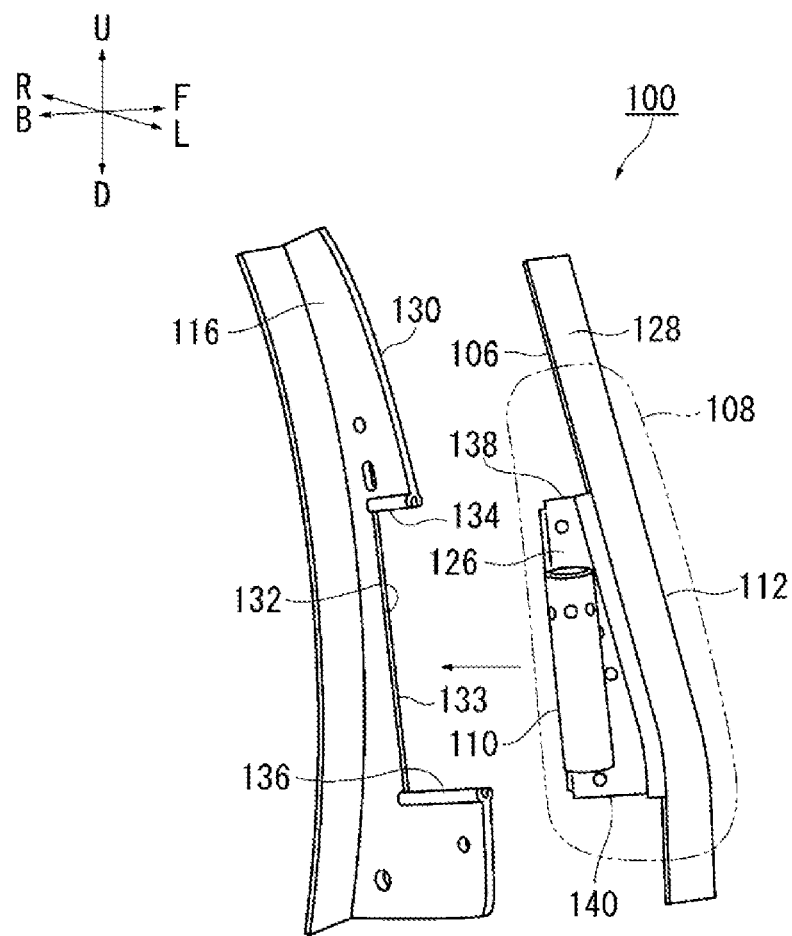
FIG. 3 is a view illustrating a condition where the airbag module in FIG. 2(a) is removed from a frame side plate part.

FIG. 3 is a view illustrating a condition where the airbag module 106 in FIG. 2(*a*) is removed from a frame side plate part 116. In the present embodiment, a notch region 132 is provided in the frame side plate part 116, in which a predetermined range of a front edge 130 is cut out, and the bracket 112 is inserted into the notch region 132, such that the airbag module 106 can be easily assembled to the vehicle.

In order to achieve the aforementioned bracket 112 assembly, guide grooves 134, 136 are formed in upper and lower edges of the notch region 132. The guide grooves 134, 136 are longitudinally formed in the front-back direction, such that an upper edge 138 and a lower edge 140 of the base part 126 can slide. The guide groove 134 has a two-way structure, and the base part 126 is guided by two-way protrusions from both sides in the vehicle width direction while the base part 126 of the bracket 112 is inserted into the groove.

Figure 4:
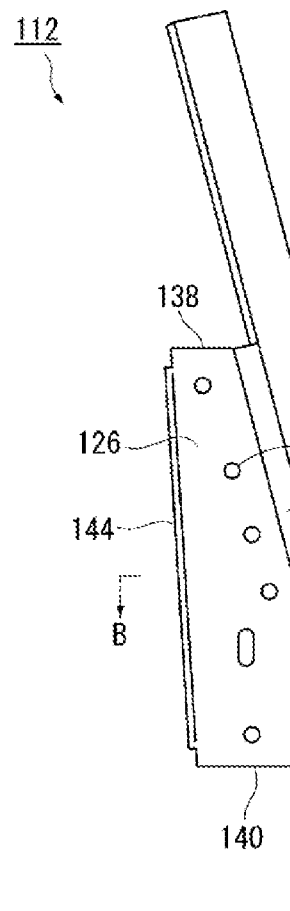
FIG. 4(a), FIG. 4(b), and FIG. 4(c) is a view independently illustrating a bracket in FIG. 3 from various directions.
Figure 4:
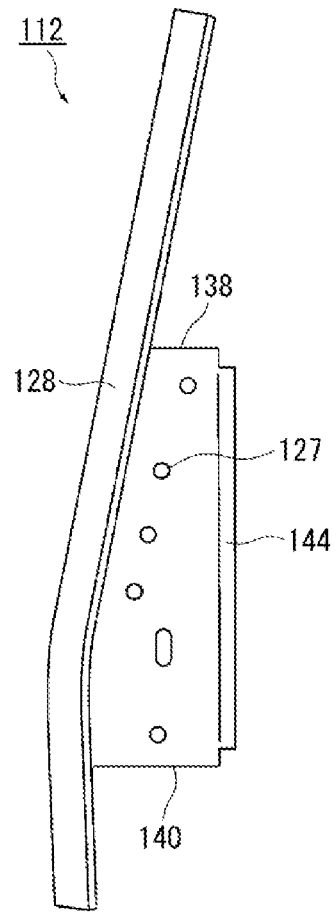
Figure 4:
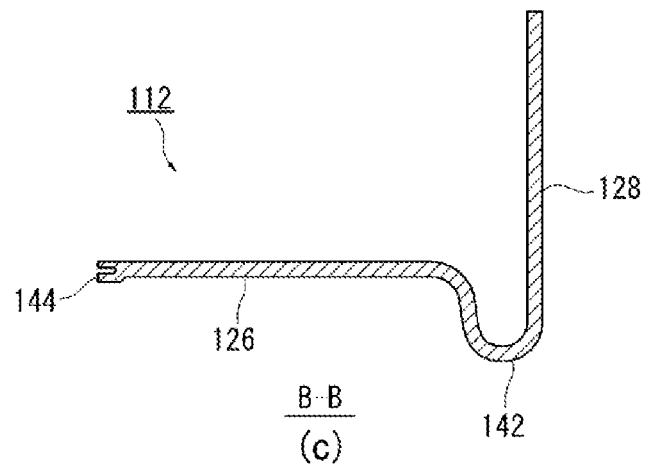

FIG. 4 is a view independently illustrating the bracket 112 in FIG. 3 from various directions. FIG. 4(*a*) is a perspective view illustrating the bracket 112 from the same direction as FIG. 3. As described above, the base part 126 of the bracket 112 is a site for securing and fastening the inflator 110 (see FIG. 3), and is fitted into the notch region 132 of the frame side plate part 116. The upper edge 138 and the lower edge 140 of the base part 126 are straight and slide in the front-back direction in the guide grooves 134, 136 of the notch region 132 of the frame side plate part 116. The base part 126 is provided with a plurality of lightening holes in addition to a bolt hole 127 through which the stud bolt 122 (see FIG. 2(*b*)) of the inflator 110 is passed.

FIG. 4(*b*) is a perspective view of the bracket 112 of FIG. 4(*a*) viewed from the vehicle outer side. The reaction force plate 128 is shaped bent to the vehicle outer side with regard to the base part 126. The reaction force plate 128 is vertically longer than the base part 126 in order to provide a wider reaction force to the airbag cushion 108. The reaction force plate 128 extends along the front edge 130 of the frame side plate part 116 at an angle at a slightly lower side point and at an incline for a large portion of an upper side.

FIG. 4(*c*) is a cross-sectional view along B-B in FIG. 4(*a*). As illustrated in FIG. 4(*c*), a curved part 142 curved so as to protrude to the vehicle inner side is provided between the base part 126 and the reaction force plate 128. The curved part 142 produces a moderate deflection of the reaction force plate 128 and absorbs a load received from the airbag cushion 108 (see FIG. 2(*b*)) during expansion.

A stopper groove 144 is provided at a rear edge of the base part 126. The stopper groove 144 has a two-way structure, and a periphery of a rear edge 133 of the notch region 132 (see FIG. 3) is sandwiched from both sides in the vehicle width direction by two-way protrusions while the rear edge 133 of the notch region 132 is inserted into a groove portion.

Figure 5:
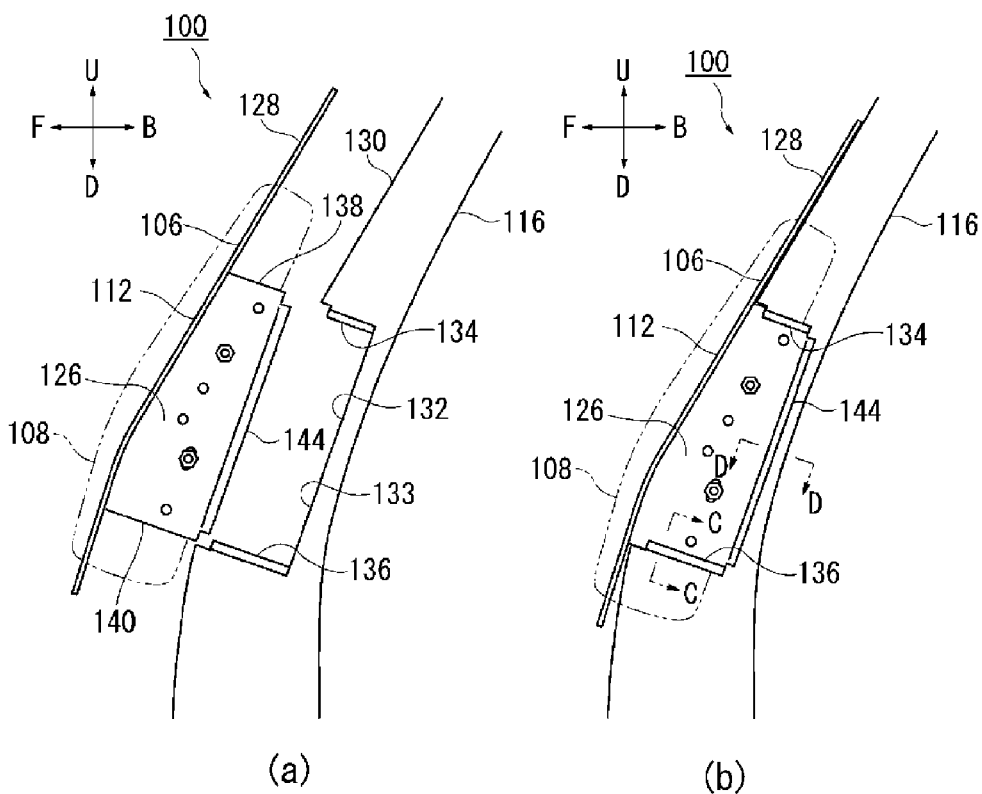
FIG. 5(a), FIG. 5(b), FIG. 5(c), and FIG. 5(d) is a view illustrating a process of assembling the airbag module in FIG. 3 to the frame side plate part.
Figure 5:
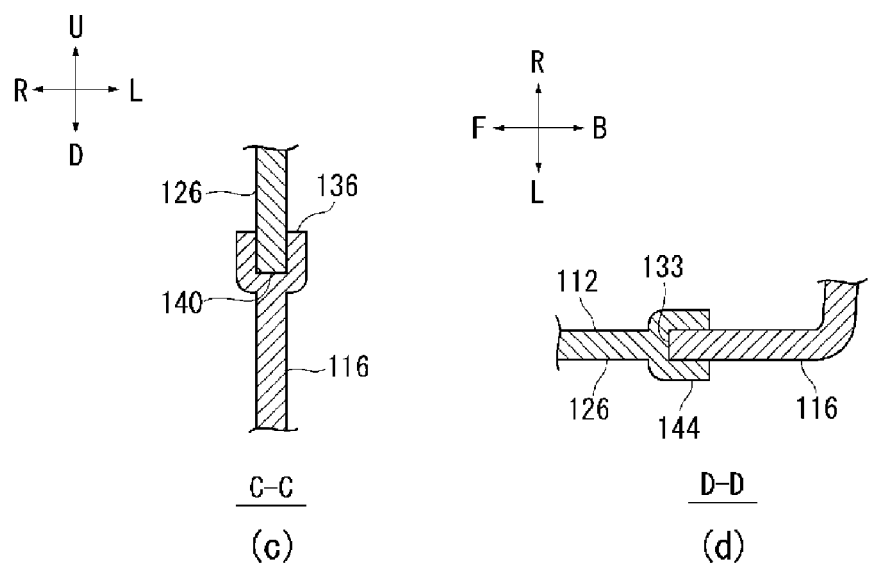

FIG. 5 is a view illustrating a process of assembling the airbag module 106 in FIG. 3 to the frame side plate part 116. FIG. 5(*a*) illustrates a condition of the airbag module 106 immediately prior to being assembled to the frame side plate part 116, as viewed from the vehicle outer side. The airbag module 106 is assembled by inserting the upper edge 138 and lower edge 140 of the base part 126 of the bracket 112 into the guide grooves 134, 136 of the notch region 132 from the front.

FIG. 5(*b*) illustrates a condition in which the airbag module 106 of FIG. 4(*a*) is fitted into the notch region 132. Assembly of the airbag module 106 is completed when the rear edge 133 of the notch region 132 (see FIG. 5(*a*)) is inserted into the stopper groove 144 of the base part 126.

FIG. 5(*c*) is a cross-sectional view along C-C of the guide groove 136 in FIG. 5(*b*). As described above, the guide groove 136 that the frame side plate part 116 has a two-way structure, and a vicinity of the lower edge 140 of the lower edge 140 of the base part 126 is guided by two-way protrusions from both sides in the vehicle width direction while the lower edge 140 of the base part 126 is inserted into the groove portion. This also applies for the upper guide groove 134. Therefore, the base part 126 inserted into the guide grooves 134, 136 in FIG. 5(*b*) is prevented from falling off in the vehicle width direction.

FIG. 5(*b*) is a cross sectional view along D-D of the stopper groove 144 of FIG. 5(*a*). As described above, the stopper groove 144 provided on the bracket 112 also has a two-way structure, and a vicinity of the rear edge 133 of the notch region 132 of the frame side plate part 116 is sandwiched by two-way protrusions from both sides in the vehicle width direction while the rear edge 133 of the notch region 132 of the frame side plate part 116 is inserted into a groove portion. Therefore, the stopper groove 144 also prevents the base part 126 of the bracket 112 from falling off in the vehicle width direction.

According to the configuration of the present embodiment, after the airbag cushion 108, the inflator 110, and the bracket 112 are integrated to form the airbag module 106, the airbag module 106 can be assembled to the seat 102 (see FIG. 1(*a*)) by simply inserting the base part 126 of the bracket 112 into the notch region 132 of the frame side plate part 116. In particular, bolts are not required to be fastened during assembly, and therefore, assembly work is simple and labor can be reduced.

In the present embodiment, the bracket 112 is inserted into the notch region 132 from the front, but the bracket 112 is not secured to the frame side plate part 116. However, the guide grooves 134, 136 and the stopper groove 144 prevent the bracket 112 from falling off in the vehicle width direction. A load received from the airbag cushion 108 is applied to the bracket 112 toward the vehicle outer side and toward the rear of the vehicle and is not applied in a direction that would cause the bracket 112 to fall off the frame side plate part 116. Therefore, the bracket 112 can fully support the airbag cushion 108 when the airbag cushion 108 is expanded and deployed and when restraining an occupant.

Note that the site where the guide groove 134 is provided is not limited to the upper and lower edges of the notched region 132. For example, the guide groove 134 can be provided on the upper edge 138 and the lower edge 140 of the base part 126. Furthermore, the guide groove can be provided, for example, on the upper edge of the notch region 132 on an upper side and on the lower edge 140 of the base part 126 on a lower side. Furthermore, the stopper groove 144 can also be provided on the rear edge 133 of the notch region 132, rather than on the rear edge of the base part 126. Based on these configurations, the bracket 112 can be assembled to the frame side plate part 116 simply by inserting the bracket 112 into the notch region 132.

As described above, according to the configuration of the present embodiment, the airbag module 106 can be easily and fully assembled to the seat 102, in other words, the vehicle.

Figure 6:
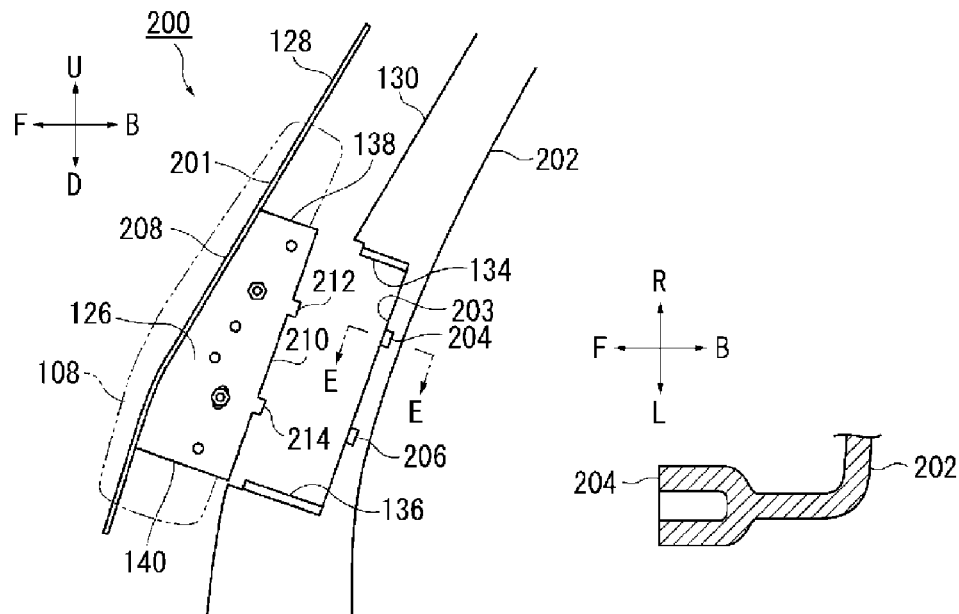
FIG. 6(a), FIG. 6(b), and FIG. 6(c) is a view illustrating a first modification example of the side airbag device in FIG. 5(a), FIG. 5(b), FIG. 5(c), and FIG. 5(d).
Figure 6:
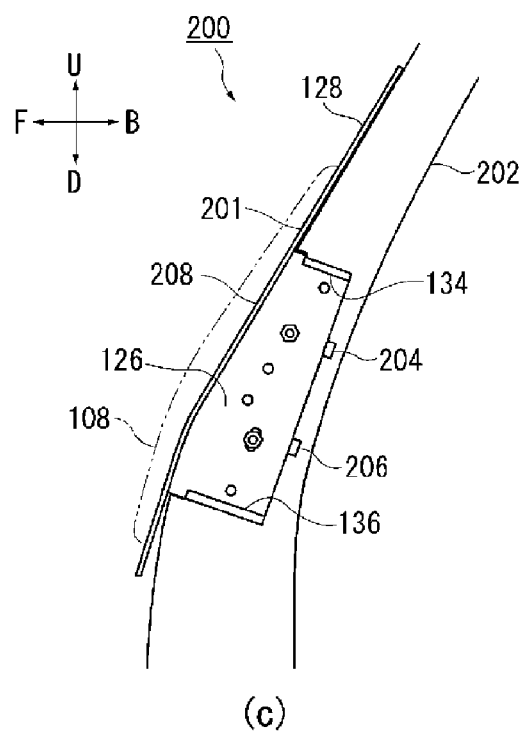

FIG. 6 is a view illustrating a first modification example (side airbag device 200) of the side airbag device 100 of FIG. 5. Hereinafter, the same components as described above are labeled with the same symbols, and therefore, descriptions thereof are omitted. Furthermore, the same names as the components described above shall have the same function unless otherwise indicated even when labeled with a different symbol.

FIG. 6(*a*) illustrates a side airbag device 200 corresponding to FIG. 5(*a*). In the side airbag device 200, stopper grooves 204, 206 are formed in a portion of a rear edge 203 of the notch region 132 of a frame side plate part 202. Furthermore, a rear edge 210 of the base part 126 of a bracket 208 has protruding portions 212, 214 that can be inserted into the stopper grooves 204, 206.

FIG. 6(*b*) is a cross-sectional view along E-E of the stopper groove 202 of FIG. 6(*a*). The stopper groove 202 also has a two-way structure, and the protruding portion 212 of the base part 126 is sandwiched by two-way protrusions from both sides in the vehicle width direction while the protruding portion 212 (see FIG. 6(*a*)) of the base part 126 is inserted into a groove portion.

FIG. 6(*c*) illustrates the side airbag device 200 corresponding to FIG. 5(*b*). In the side airbag device 200, assembly of the airbag module 201 is completed by inserting the protruding portions 212, 214 (see FIG. 6(*a*)) of the base part 126 into the stopper grooves 202, 204 of the notch region 132.

Based on the configuration of the present embodiment, the airbag module 201 can be easily and fully assembled to the seat 102 (see FIG. 1(*a*)) simply by inserting the base part 126 of the bracket 112 into the notch region 132 of the frame side plate part 116.

Figure 7:
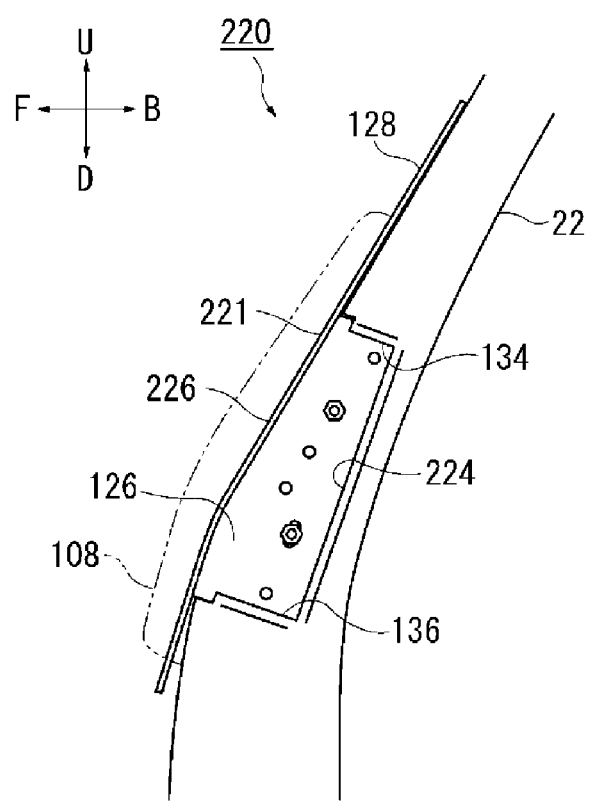
FIG. 7 is a view illustrating a second modification example of the side airbag device in FIG.

FIG. 7 is a view illustrating a second modification example (side airbag device 220) of the side airbag device 100 of FIG. 5. FIG. 7 illustrates the side airbag device 200 corresponding to FIG. 5(*b*). In a frame side plate part 222 of the side airbag device 220, the guide grooves 134, 136 are formed in the upper and lower edges of the notch region 132. Furthermore, a stopper groove 224 is continuously formed on the rear edge of the notch region 132 with the guide grooves 134, 136.

According to the side airbag device 220, a groove is formed over an entire range of an edge of the notch region 132 into which an edge of the base part 126 of the bracket 226 is inserted. With this configuration, the entire range of edge of the notch region 132 and the bracket 226 are coupled to each other, and therefore, the rigidity of the frame side plate part 222 can be further supplemented, and the assembly rigidity of the airbag module 221 can be increased. Note that this configuration can be applied to continuously provide a guide groove and a stopper groove on an entire range of an edge of a base part of a bracket.

Figure 8:
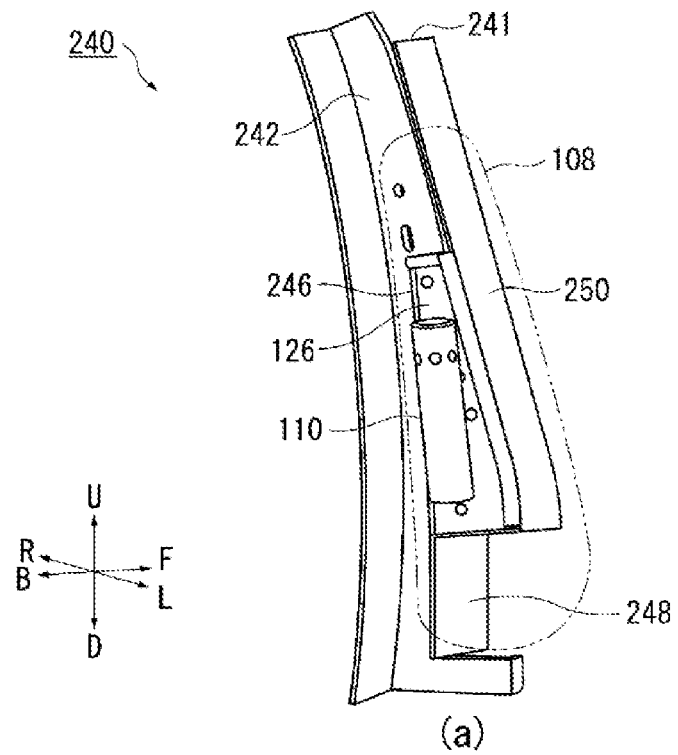
FIG. 8(a) and 8(b) is a view illustrating a third modification example of the side airbag device in FIG. 2(a).
Figure 8:
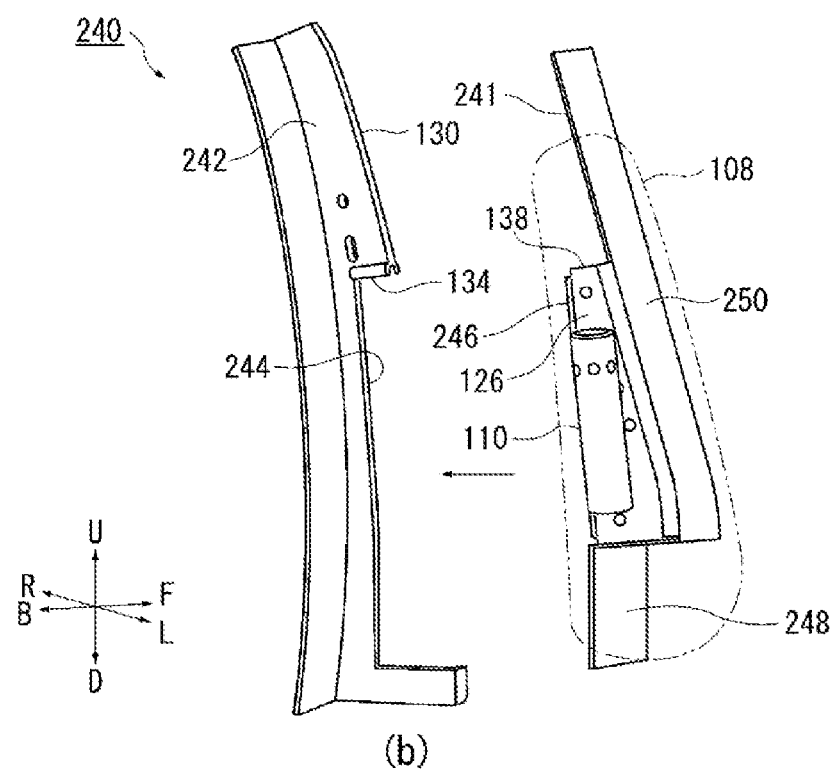

FIG. 8 is a view illustrating a third modification example (side airbag device 240) of the side airbag device of FIG. 2(a). FIG. 8(a) illustrates a side airbag device 240 corresponding to FIG. 2(a). The side airbag device 240 has a different configuration from each of the side airbag devices from the perspective that a notch region 244 of a frame side plate part 242 is downwardly wider and a recessed lower region 248 is formed in a bracket 246.

FIG. 8(b) illustrates the side airbag device 240 corresponding to FIG. 3. Of the frame side plate portion 242, the notch region 244 is formed extending over a range below the base part 126 of the bracket 246. Furthermore, of an airbag module 241, a reaction force plate 250 of the bracket 246 has a lower region 248 with a shape recessed rearward along the notch region 244 that is formed in a region extending below than the base part 126.

In the side airbag device 240, the recessed lower region 248 is formed in the bracket 246, and therefore, the airbag cushion 108 can be stored therein. In the airbag cushion 108 in a stored form, a fabric is often collected on a lower side, and thus the lower side tends to be thick. If the airbag cushion 108 is thick, the shape of padding in a seat must be changed or a range of opening of the cover of the seat 102 must be changed when storing in the seat 102 (see FIG. 1(a)), which increases labor and cost. For the side airbag device 240, the lower region 248 is used as an evacuation location for the airbag cushion 108, and therefore, a limited space inside the seat 102 can be effectively used, which is beneficial from the perspective of labor and cost.

Figure 9:
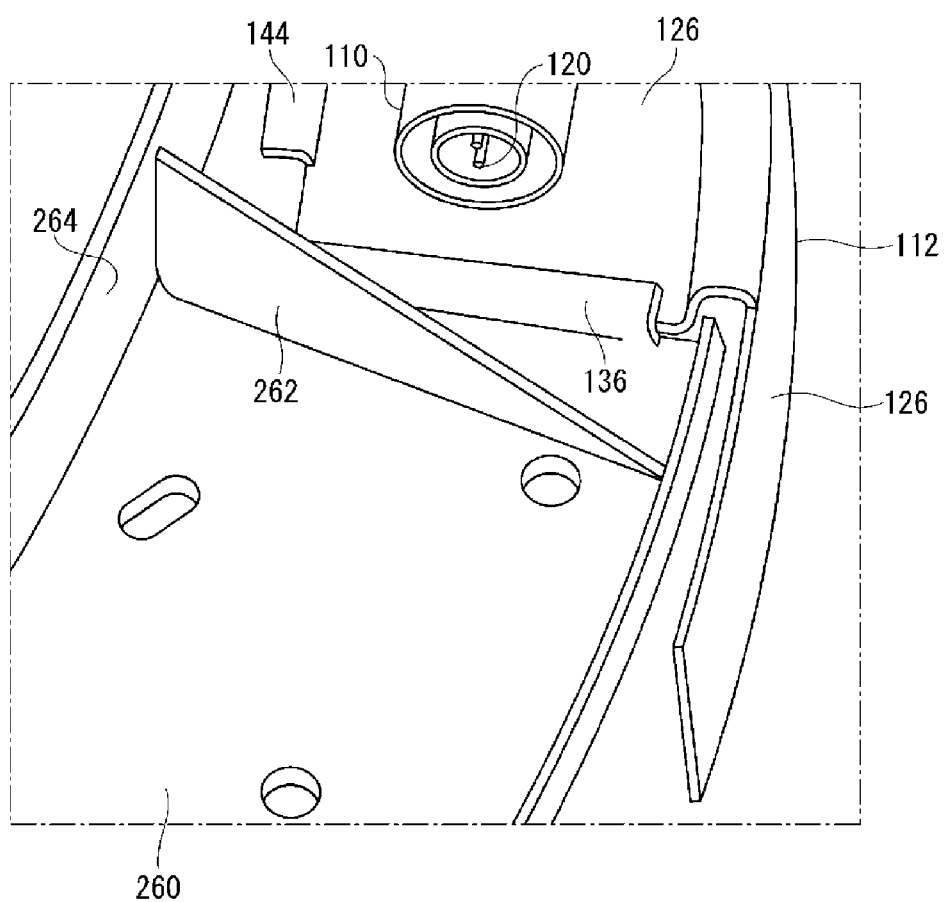
FIG. 9 is a first modification example of the frame side plate part in FIG. 2(a).

FIG. 9 is a first modification example (frame side plate part 260) of the frame side plate part 116 of FIG. 2(a). The frame side plate part 260 has a predetermined first rib 262 in a periphery of the notch region 132. The rib 262 is provided so as to span a surface of the frame side plate part 260 on the vehicle inner side and a rear flange 264. According to the rib 262, even if the notch region 132 is provided on the frame side plate part 260, the rigidity of the frame side plate part 260 can be supplemented. This rib 262 can also be provided on any of the frame side plate parts described above.

Figure 10:
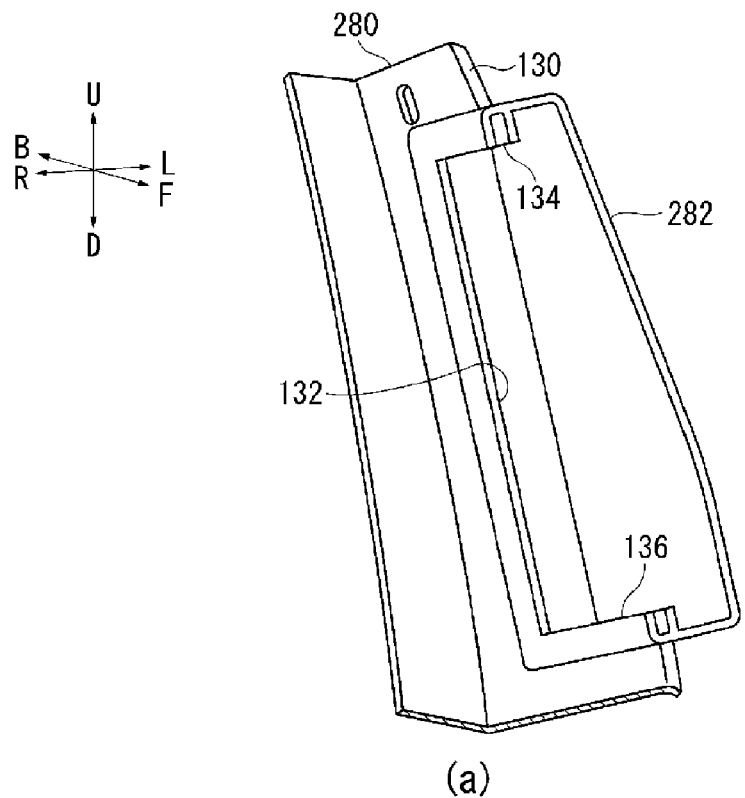
FIG. 10(a) and 10(b) is a second modification example of the frame side plate part in FIG. 2(a).
Figure 10:
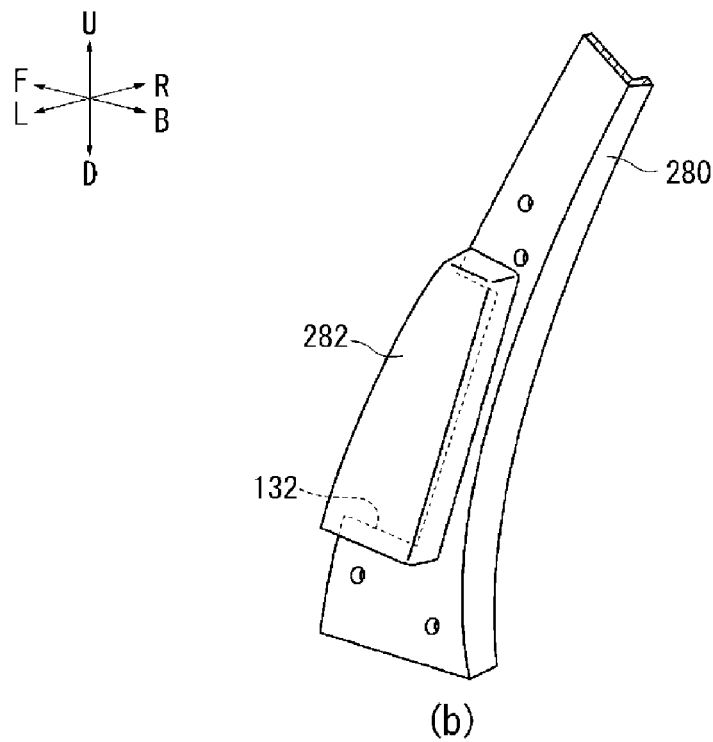

FIG. 10 is a second modification example (frame side plate part 280) of the frame side plate part 116 of FIG. 2(a). FIG. 10(a) is a perspective view of a frame side plate part 280 as viewed from the vehicle inner side. The frame side plate part 280 has a box shaped part 282 on the vehicle outer side of the notch region 132. The box shaped part 282 is formed on one side in the vehicle width direction and is configured to be open toward the front. The notch region 132 is formed in a range of the front edge 130 of the frame side plate part 116 on an inner side of the box shaped part 282.

FIG. 10(b) is a perspective view of a frame side plate part 280 of the FIG. 10(a) as viewed from the vehicle inner side. The box shaped part 282 covers the notch region 132 from the vehicle outer side. The box shaped part 282 can also supplement the rigidity of the frame side plate part 280 having the notch region 132.

Figure 11:
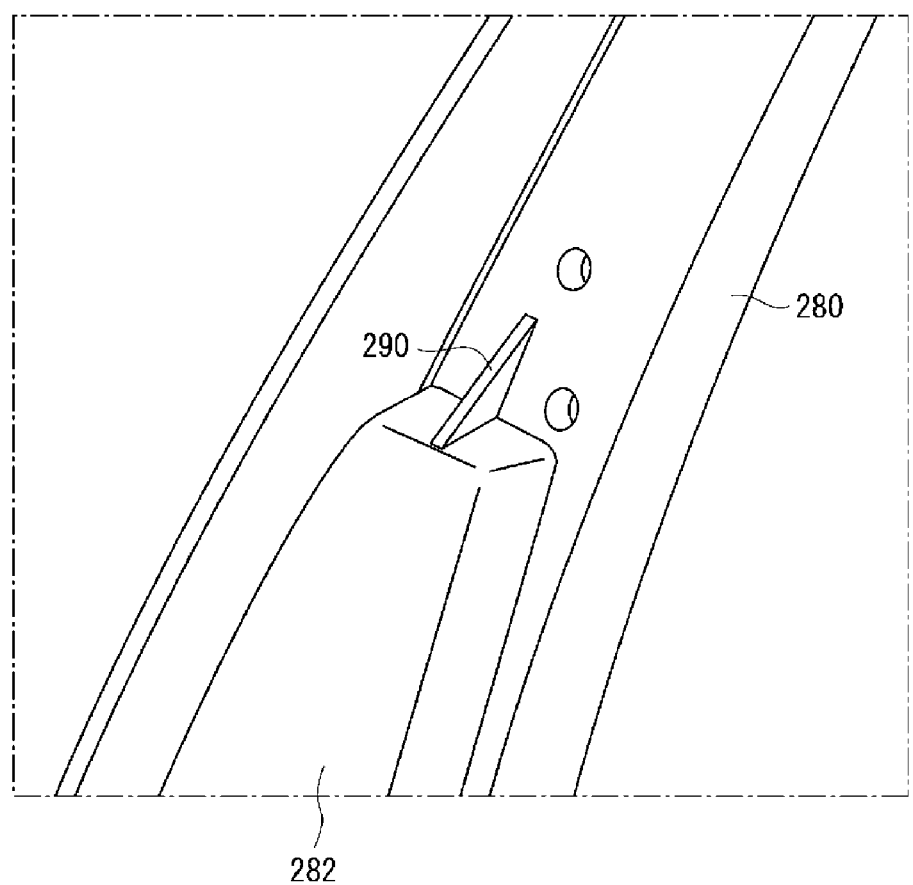
FIG. 11 is an example of adding a second rib to a box shaped part in FIG. 10(b).

FIG. 11 is an example of adding a second rib 290 to the box shaped part 282 in FIG. 10(b). The rib 290 is provided so as to span an upper surface of the box shaped part 282 and a surface of the frame side plate part 280 on the vehicle inner side. The rib 290 is continuously provided with the box shaped part 282, such that the rigidity of the frame side plate part 280 can be further supplemented. Note that the box shaped part 283 and the rib 290 can also be provided on any of the frame side plate parts described above.

Embodiment 2

Figure 12:
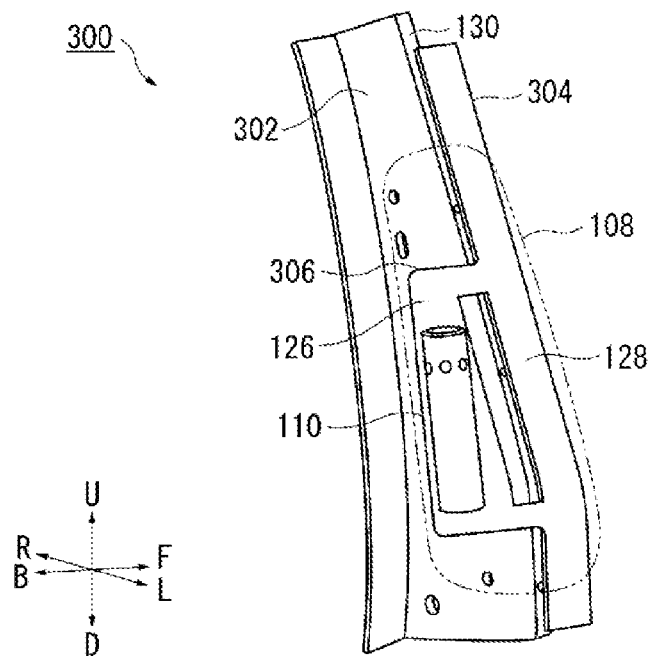
FIG. 12(a) and 12(b) is a view illustrating a side airbag device according to Embodiment 2 of the present invention.
Figure 12:
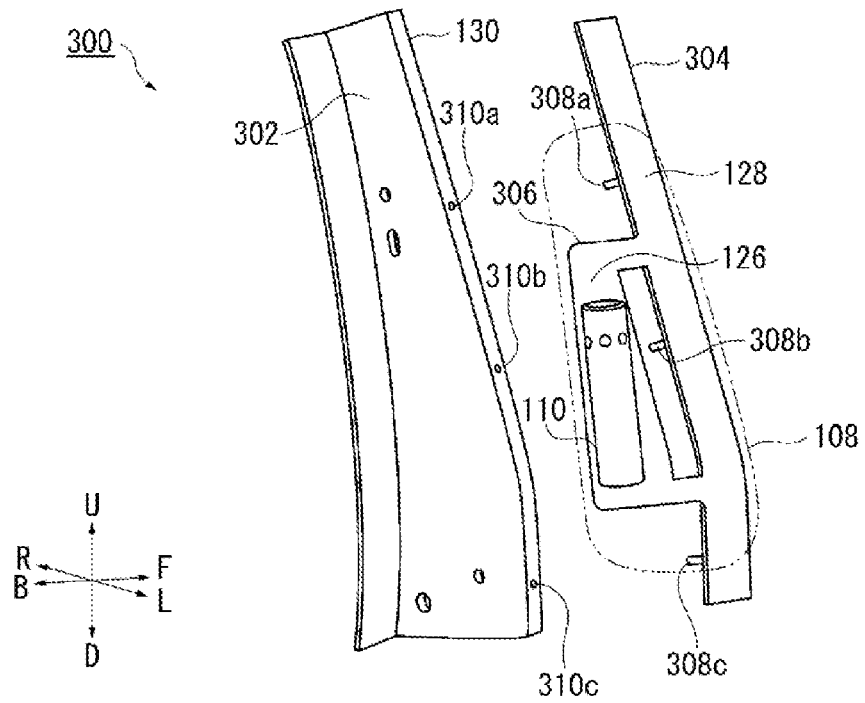

FIG. 12 is a view illustrating a side airbag device 300 according to Embodiment 2 of the present invention. FIG. 12(a) illustrates a side airbag device 300 corresponding to FIG. 2(a). The configuration of the side airbag device 300 is different from each of the side airbag devices of Embodiment 1 from the perspective that the notch region 132 (see FIG. 3) is not present in a frame side plate part 302 and an airbag module 304 is assembled to a frame side plate part 302 using a protruding part (front side protruding parts 308a to 308c in FIG. 12(b)) of a bracket 306.

FIG. 12(b) is a view illustrating the side airbag device 300 corresponding to FIG. 3. The base part 126 of the bracket 306 is along a surface of the frame side plate part 302 on the vehicle inner side. The reaction force plate 128 extends from the base part 126 across the front edge 130 of the frame side plate part 302 in the vehicle width direction to the vehicle outer side. Furthermore, as a plurality of protruding parts, a total of three front side protruding parts 308a to 308c are provided on the rear side of the reaction force plate 128, extending from the reaction force plate 128 to the frame side plate part 302 on the rear.

The front side protruding parts 308a to 308c are spaced apart in an up-down direction of the reaction force plate 128 and extend toward the front edge 130 of the frame side plate part 302. Corresponding to the front side protruding parts 308a to 308c, a total of three front side insertion hole 310a to 310c into which the respective front side protruding parts 308a to 308c are inserted are provided in the front edge 130 of the frame side plate part 302.

Figure 13:
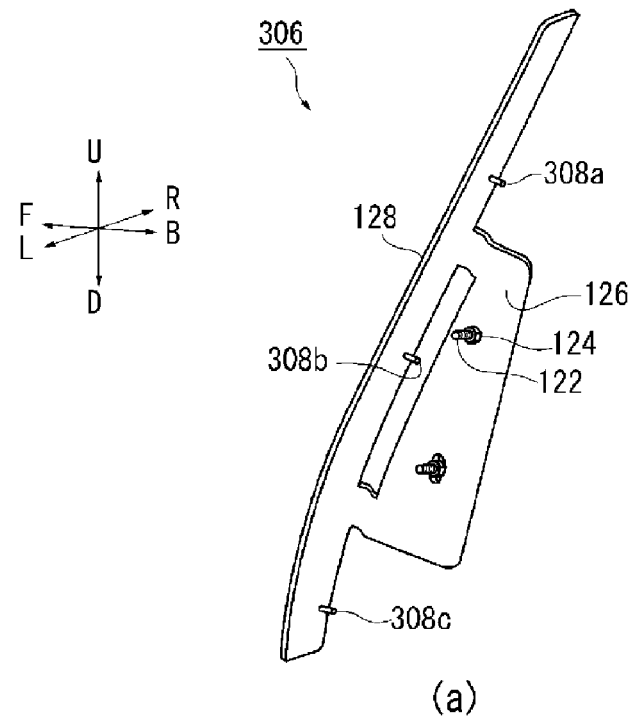
FIG. 13(a) and 13(b) is a view illustrating the side airbag device in FIG. 12(a) and 12(b) from another direction.
Figure 13:
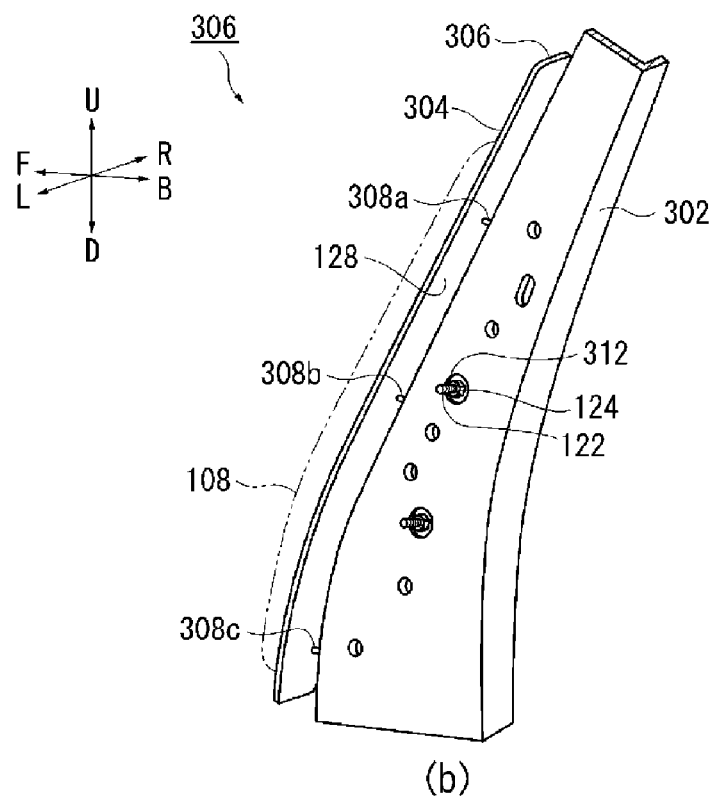

FIG. 13 is a view illustrating the side airbag device 300 in FIG. 12 from another direction. FIG. 13(a) illustrates the bracket 306 of FIG. 12(b) as viewed from vehicle outer side. The stud bolt 122 of the inflator 110 (see FIG. 12(b)) extends through the base part 126 of the bracket 306 toward the vehicle outer side. The stud bolt 122 can be used as a side surface protruding part.

FIG. 13(b) illustrates the side airbag device 300 of FIG. 12(a) from vehicle outer side. The front side protruding parts 308a to 308c described above are inserted into the front side insertion holes 310a to 310c (see FIG. 12(b)) of the frame side plate part 302 from the front of the vehicle. Furthermore, the stud bolt 122 serving as a side surface protruding part is inserted into a side surface insertion hole 312 formed penetrating through the frame side plate part 302 in the vehicle width direction from the vehicle inner side. At this time, the side surface insertion hole 312 is simply configured to be hooked through the stud bolt 122 and nut 124, and is formed with a larger diameter than the nut 124. Note that the side surface insertion hole 312 can also be implemented as a non-penetrating recessed shape if the frame side plate part 302 is thick in the vehicle width direction.

According to the configuration of the present embodiment, after the airbag cushion 108, the inflator 110, and the bracket 306 are integrated to form the airbag module 304, the airbag module 304 can be assembled to the seat 102 (see FIG. 1(a)) simply by inserting the front side protruding parts 308a to 308c of the bracket 306 and the stud bolt 122 serving as the side surface protruding part into the frame side plate part 302. According to this configuration, bolts are also not required to be fastened during assembly, and therefore, assembly work is simple and labor can be reduced.

In the present embodiment, the bracket 306 is not bolted or the like to the frame side plate part 302, except that the protruding parts are inserted into the frame side plate part 302. However, the front side protruding parts 308a to 308c extending rearwardly prevent the bracket 306 from moving in the vehicle width direction, and the stud bolt 122 extending to the vehicle outer side prevents the bracket 306 from moving in the front-back direction. Therefore, even if the bracket 306 is subjected to a load from the airbag cushion 108 to the vehicle outer side and rear side, there is no concern that the bracket 306 will fall off the frame side plate part 302, and thus the airbag cushion 108 can be suitably supported.

As described above, according to the configuration of the present embodiment, the airbag module 304 can also be easily and fully assembled to the seat 102 (see FIG. 1(a)), in other words, the vehicle. Note that the number of the front side protruding parts 308a to 308c can be further increased. By increasing the number of the front side protruding parts 308a to 308c, the posture of the bracket 306 when assembled to the frame side plate part 302 becomes more stable.

Figure 14:
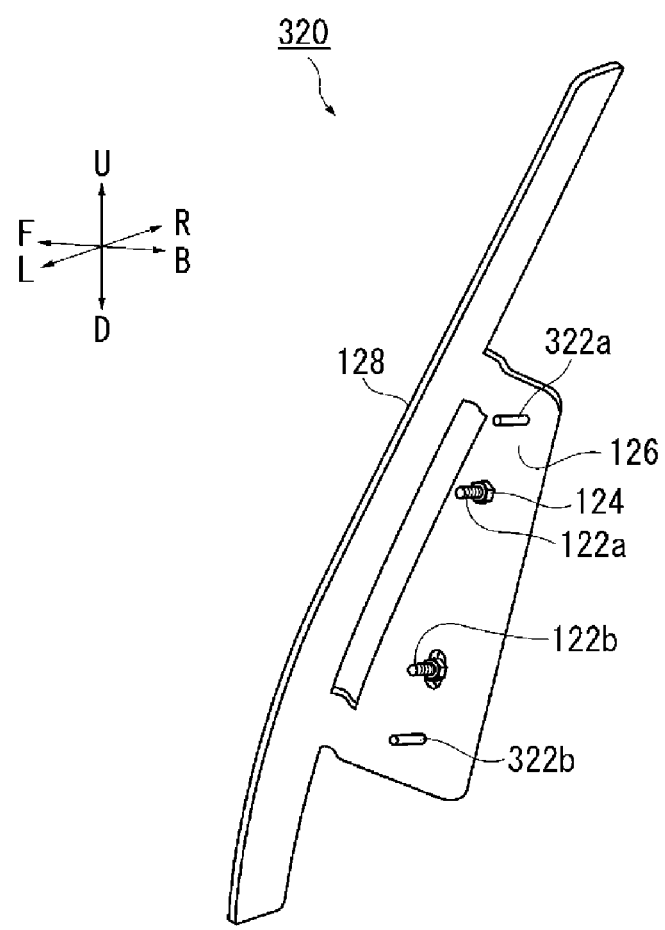
FIG. 14 is a first modification example of a bracket in FIG. 13(b).

FIG. 14 is a first modification example (bracket 320) of the bracket in FIG. 13(b). The bracket 320 can be provided only with a side surface protruding part with the front side protruding parts 308a to 308c omitted. For example, in addition to the two stud bolts 122a, 122b functioning as side surface protruding parts, two new side surface protruding parts 322a, 322b are added to the bracket 320.

The bracket 320 is assembled to an inner side of the frame side plate part 302 (see FIG. 13(b)) by inserting a total of four protruding parts, namely the stud bolts 122a, 122b and the side surface protruding parts 322a, 322b, into the frame side plate part 302. Even in this case, the protruding parts prevent the bracket 320 from moving in the front-back direction. Therefore, even if the bracket 320 is subjected to a load from the airbag cushion 108 to the vehicle outer side and rear side, there is no concern that the bracket 306 will fall off the frame side plate part 302, and thus the airbag cushion 118 can be suitably supported.

Note that the number of the side surface protruding parts 322a, 322b can be further increased. By increasing the number of the side surface protruding parts 322a, 322b, the posture of the bracket 306 when assembled to the frame side plate part 302 becomes more stable.

Figure 15:
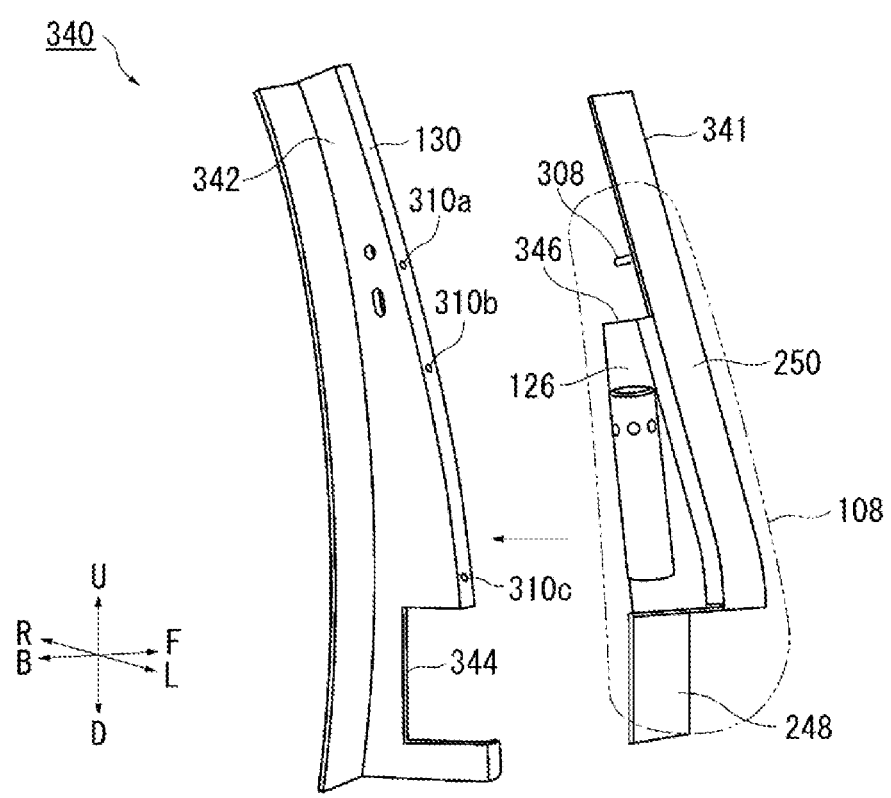
FIG. 15 is a view illustrating a first modification example of the side airbag device in FIG. 13(b).

FIG. 15 is a view illustrating a first modification example (side airbag device 340) of the side airbag device 300 of FIG. 13(b). FIG. 15(a) illustrates a side airbag device 340 corresponding to FIG. 11(a). The side airbag device 340 has a different configuration from each of the side airbag devices from the perspective that a notch region 344 is formed on a frame side plate part 342 and the recessed lower region 248 is formed in a bracket 346.

FIG. 15(b) illustrates the side airbag device 340 corresponding to FIG. 11(b). The notch region 344 of the frame side plate part 342 is formed in a range below the base part 126 of the bracket 346. Furthermore, the reaction force plate 250 of the bracket 346 of an airbag module 341 has the lower region 248 with a shape recessed rearward along the notch region 344 that is formed in a region extending below the base part 126.

In the side airbag device 340, the recessed lower region 248 is formed in the bracket 346, and therefore, the airbag cushion 108 can be stored therein, similar to the side airbag device 240 of FIG. 8. For the side airbag device 340, the lower region 248 is also used as an evacuation location for the airbag cushion 108, and therefore, a limited space inside the seat 102 (see FIG. 1(a)) can be effectively used, which is beneficial from the perspective of labor and cost.

Figure 16:
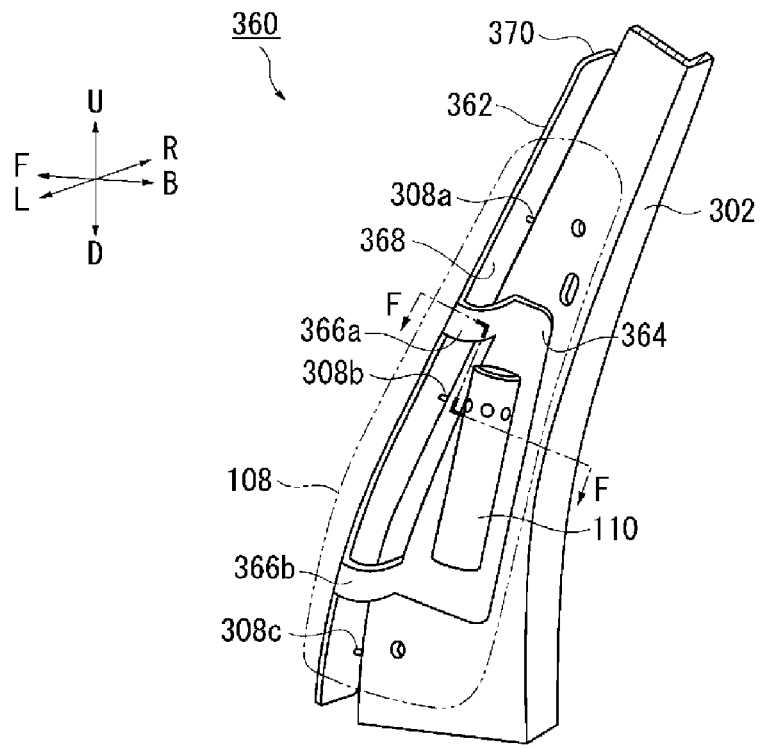
FIG. 16(a) and 16(b) is a view illustrating a second modification example of the side airbag device in FIG. 13(b).
Figure 16:
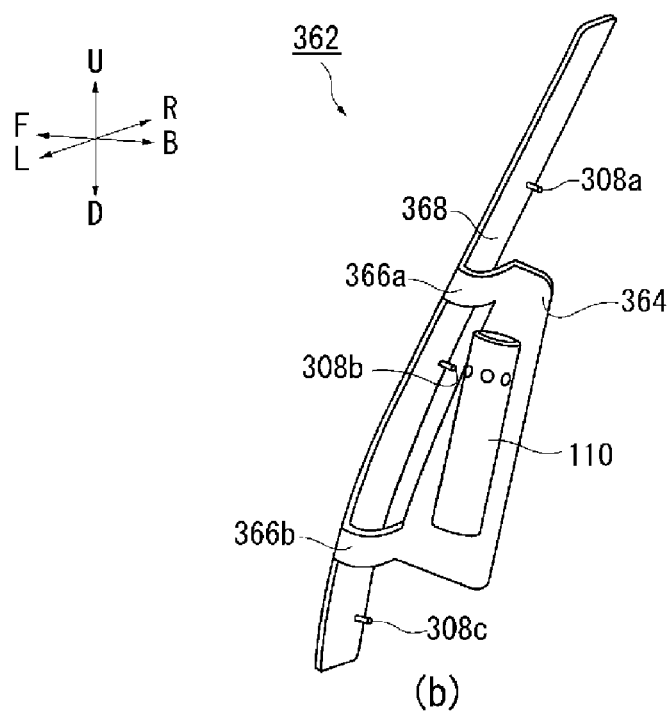

FIG. 16 is a view illustrating a second modification example (side airbag device 360) of the side airbag device 300 of FIG. 13(b). FIG. 16(a) illustrates the side airbag device 360 corresponding to FIG. 13(b). The configuration of the side airbag device 360 is different from the side airbag device 300 from the perspective that a base part 364 of a bracket 362 is attached along a surface of the frame side plate part 302 on an outer side in the vehicle width direction, and the inflator 110 and the airbag cushion 108 are also provided on the outer side of the base part 364 in the vehicle width direction.

FIG. 16(b) is a view illustrating the bracket 362 and inflator 110 of FIG. 16(a). The base part 364 of the bracket 362 is provided in a flat plate shape along the outer surface of the frame side plate 302 (FIG. 16(a)) in the vehicle width direction. Legs 366a, 366b curved to protrude to the outer side in the vehicle width direction are provided on a front edge of the base part 364, and a reaction force plate 368 extends from the legs 366a, 366b to the inner side in the vehicle width direction.

FIG. 17 is a cross-sectional view of the side airbag device 360 in FIG. 16(a) and a view illustrating another modification example. FIG. 17(a) is a cross-sectional view along F-F of the side airbag device 360 of FIG. 16(a). As illustrated in FIG. 17(a), the reaction force plate 368 extends to the inner side in the vehicle width direction via the leg 366a that bends from a front side of the base part 364. In the side airbag device 360, the airbag cushion 108 can also push against the reaction force plate 368 to expand and deploy efficiently toward the front of the vehicle.

Based on the configuration of the side airbag device 360, after the airbag cushion 108, the inflator 110, and the bracket 362 are integrated to form an airbag module 370, the airbag module 370 can be assembled to the seat 102 (see FIG. 1(a)) simply by inserting the front side protruding parts 308a to 308c (see FIG. 16(b)) of the bracket 362 and the stud bolt 122 (see FIG. 17(a)) serving as the side surface protruding part into the frame side plate part 302. According to this configuration, bolts are also not required to be fastened during assembly, and therefore, assembly work is simple and labor can be reduced.

In the present embodiment, the bracket 362 is not bolted or the like to the frame side plate part 302, except that the protruding parts are inserted into the frame side plate part 302. However, the front side protruding parts 308a to 308c (see FIG. 16(b)) extending rearwardly prevent the bracket 362 from moving in the vehicle width direction, and the stud bolt 122 extending to the inner side in the vehicle width direction prevents the bracket 362 from moving in the front-back direction. Therefore, even if the bracket 362 is subjected to a load from the airbag cushion 108 to the inner side in the vehicle width direction and rear side, there is no concern that the bracket 362 will fall off the frame side plate part 302, and thus the airbag cushion 108 can be suitably supported.

As described above, based on the configuration of the side airbag device 360, the airbag module 370 can also be easily and fully assembled to the seat 102 (see FIG. 1(a)), in other words, the vehicle. Note that the number of the front side protruding parts 308a to 308c (see FIG. 16(b)) can be further increased. Furthermore, similar to the side surface protruding parts 322a, 322b of the bracket 320 of FIG. 14, the bracket 362 can also be provided with a side surface protruding part extending to the inner side in the vehicle width direction from the base part 364 in place of the front side protruding part 308a to 308. Even in this case, the bracket 362 can be assembled on the outer side of the frame side plate part 302 in the vehicle width direction by inserting the stud bolt 122 and the side surface protruding part into the frame side plate part 302, and thus the airbag cushion 108 can be suitably continually supported.

FIG. 17(b) is a fourth modification example (side airbag device 380) of the side airbag device 1000 of FIG. 2(b). In a side airbag device 380, similar to the side airbag device 360 of FIG. 17(a), the inflator 110 and the airbag cushion 108 are provided on the outer side of the base part 384 of the bracket 382 in the vehicle width direction.

Similar to the side airbag device 100 of FIG. 2(a), the side airbag device 380 is configured to be assembled by inserting the base part 384 of the bracket 382 into the notch region 132 of the frame side plate part 116. In the bracket 382, the stopper groove 144 on the rear edge of the base part 384 also sandwiches a periphery of the rear edge of the notch region 132 from both sides in the vehicle width direction. Furthermore, the reaction force plate 368 extends to the inner side in the vehicle width direction via the leg 366a bent from a front side of the base part 384. In the side airbag device 380, the airbag cushion 108 can also push against the reaction force plate 368 to expand and deploy efficiently toward the front of the vehicle.

In the side airbag device 380, the following effects are achieved similarly to the side airbag device 100 of Embodiment 1 illustrated in FIG. 2(b) and the like. In other words, after the airbag cushion 108, the inflator 110, and the bracket 382 are integrated to form an airbag module 390, the airbag module 390 can be assembled to the seat 102 (see FIG. 1(a)) by simply inserting the base part 384 of the bracket 382 into the notch region 132 of the frame side plate part 116. In particular, bolts are not required to be fastened during assembly, and therefore, assembly work is simple and labor can be reduced.

Furthermore, in the side airbag device 380, the guide grooves 134, 136 (see FIG. 5) and the stopper groove 144 can be used to prevent the bracket 382 from falling off in the vehicle width direction, and thus the airbag cushion 108 can be fully supported by the bracket 382.

Note that in the side airbag device 360 of FIG. 17(a) and the side airbag device 380 of FIG. 17(b), the notch region 344 of the frame side plate part 342 of FIG. 15 and the notch region 244 of the frame side plate part 242 of FIG. 8(b) can also be provided, and the lower region 248 is provided on a lower side of each bracket. In this case, for the side airbag devices 360, 380, similarly to the side airbag device 240 of FIG. 8, the lower region 248 can also used as an evacuation location for the airbag cushion 108, and therefore, a limited space inside the seat 102 (see FIG. 1(a)) can be effectively used, which is beneficial from the perspective of labor and cost.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used in an airbag device mounted on a vehicle.

DESCRIPTION OF CODES

100 . . . Side airbag device, 102 . . . Seat, 106 . . . Airbag module, 108 . . . Airbag cushion, 110 . . . Inflator, 112 . . . Bracket, 114 . . . Frame member, 116 . . . Frame side plate part, 118 . . . Gas ejection hole, 120 . . . Terminal, 122 . . . Stud bolt, 122a, 122b . . . Stud bolt, 124 . . . Nut, 126 . . . Base part, 128 . . . Reaction force plate, 130 . . . Front edge, 132 . . . Notch region, 133 . . . Rear edge, 134 . . . Guide groove, 138 . . . Upper edge, 140 . . . Lower edge, 142 . . . Curved part, 144 . . . Stopper groove, 200 . . . Side airbag device, 201 . . . Airbag module, 202 . . . Frame side plate part, 204 . . . Stopper groove, 208 . . . Bracket, 210 . . . Rear edge, 212 . . . Protruding part, 220 . . . Side airbag device, 221 . . . Airbag module, 222 . . . Frame side plate part, 224 . . . Stopper groove, 226 . . . Bracket, 240 . . . Side airbag device, 241 . . . Airbag module, 242 . . . Frame side plate part, 244 . . . Notch region, 246 . . . Bracket, 248 . . . Lower region, 250 . . . Reaction force plate, 260 . . . Frame side plate part, 262 . . . Rib, 264 . . . Flange, 280 . . . Frame side plate part, 282 . . . Box shaped part, 290 . . . Rib, 300 . . . Side airbag device, 302 . . . Frame side plate part, 304 . . . Airbag module, 306 . . . Bracket, 308a to 308c . . . Front side protruding part, 310a . . . Front side insertion hole, 312 . . . Side surface insertion hole, 320 . . . Bracket, 322a to 322b . . . Side surface protruding part, 340 . . . Side airbag device, 341 . . . Airbag module, 342 . . . Frame side plate part, 344 . . . Notch region, 346 . . . Bracket, 360 . . . Side airbag device, 362 . . . Bracket, 364 . . . Base part, 366a, 366b . . . Leg, 368 . . . Reaction force plate, 370 . . . Airbag module, 380 . . . Side airbag device, 382 . . . Bracket, 384 . . . Base part, 390 . . . Airbag module

The invention claimed is:

1. A side airbag device, comprising:
a frame side plate part along a side surface of a backrest of an internal frame of a vehicle seat; and
a bracket attached to the frame side plate part in a condition where a predetermined airbag cushion and inflator are secured, wherein
the frame side plate part has a notch region where a predetermined range of a front edge is cut out,
the bracket has:
a base part fitted into the notch region of the frame side plate part and to which the airbag cushion and inflator are secured;
a reaction force plate bent from a front side of the base part and extending in to one side in a vehicle width direction;
a guide groove that is long in a front-back direction is formed on an upper edge or lower edge on either the notch region or the base part such that the other can slide; and the base part can be inserted into the notch region from the front along the guide groove.

2. The side airbag device according to claim 1, wherein a stopper groove is formed on a rear edge of either the notch region or the base part such that the other can be inserted.

3. The side airbag device according to claim 2, wherein the stopper groove is formed on a portion of the rear edge, and a protruding part that can be inserted in the stopper groove formed on a portion of the rear edge is formed on a rear edge of the other.

4. The side airbag device according to claim 1, wherein the guide groove is formed on the upper edge and lower edge of the notch region or the base part, and the stopper groove is continuously formed with the guide groove on the rear edge of the notch region or base part where the guide groove is formed.

5. The side airbag device according to claim 1, wherein the frame side plate part further has a predetermined first rib in a periphery of the notch region.

6. The side airbag device according to claim 1, wherein the frame side plate part further has a box shaped part formed on one side in the vehicle width direction and open toward the front, and the notch region is formed in a range on an inner side of the box shaped part of the front edge of the frame side plate part.

7. The side airbag device according to claim 6, wherein the frame side plate part further has a predetermined second rib provided continuously with the box shaped part.

8. The side airbag device according to claim 1, wherein the guide groove is formed on the upper edge of the notch region or the base part, the notch region is also formed over a range below the base part, and the reaction force plate has a lower region extending below the base part and recessed along the notch region.

9. A side airbag device, comprising:

a frame side plate part along a side surface of a backrest of an internal frame of a vehicle seat; and a bracket attached to the frame side plate part in a condition where a predetermined airbag cushion and inflator are secured, wherein the bracket has:

a base part attached along a surface on an inner side of the frame side plate part in the vehicle width direction to which the inflator and the inflator are fixed;

a reaction force plate extending in a vehicle width direction across a front edge of the frame side plate part from the base part; and a plurality of protruding parts extending from the base part or the reaction force plate and inserted into the frame side plate part.

10. A side airbag device, comprising:

a frame side plate part along a side surface of a backrest of an internal frame of a vehicle seat; and a bracket attached to the frame side plate part in a condition where a predetermined airbag cushion and inflator are secured, wherein the bracket has:

a base part attached along a surface on an outer side of the frame side plate part in the vehicle width direction to which the inflator and the inflator are fixed;

a reaction force plate extending in a vehicle width direction across a front edge of the frame side plate part from the base part; and a plurality of protruding parts extending from the base part or the reaction force plate and inserted into the frame side plate part.

11. The side airbag device according to claim 9, wherein the plurality of protruding parts includes one or a plurality of front side protruding parts extending toward the front edge of the frame side plate part from the reaction force plate, and the frame side plate part has a front side insertion hole formed in the front edge and into which the one or plurality of front side protruding parts is inserted.

12. The side airbag device according to claim 11, wherein the plurality of protruding parts includes one or a plurality of side surface protruding parts extending toward the frame side plate part from the base part, and the frame side plate part has a side surface insertion hole formed penetrating or recessing in the vehicle width direction and into which the one or plurality of side surface protruding parts is inserted.

13. The side airbag device according to claim 12, wherein a stud bolt extending from the inflator penetrates the base part and protrudes on the frame side plate part side, and the one or plurality of side surface protruding parts includes the stud bolt.

14. The side airbag device according to claim 9, wherein the frame side plate part has a notch region cut out of a predetermined range of the front edge of the frame side plate part below the base part of the bracket, and the reaction force plate has a lower region extending below the base part and recessed along the notch region.

* * * * *